May 9, 1950 R. G. LE TOURNEAU 2,506,930
WAGON LOADING MECHANISM
Filed June 11, 1946 3 Sheets-Sheet 1
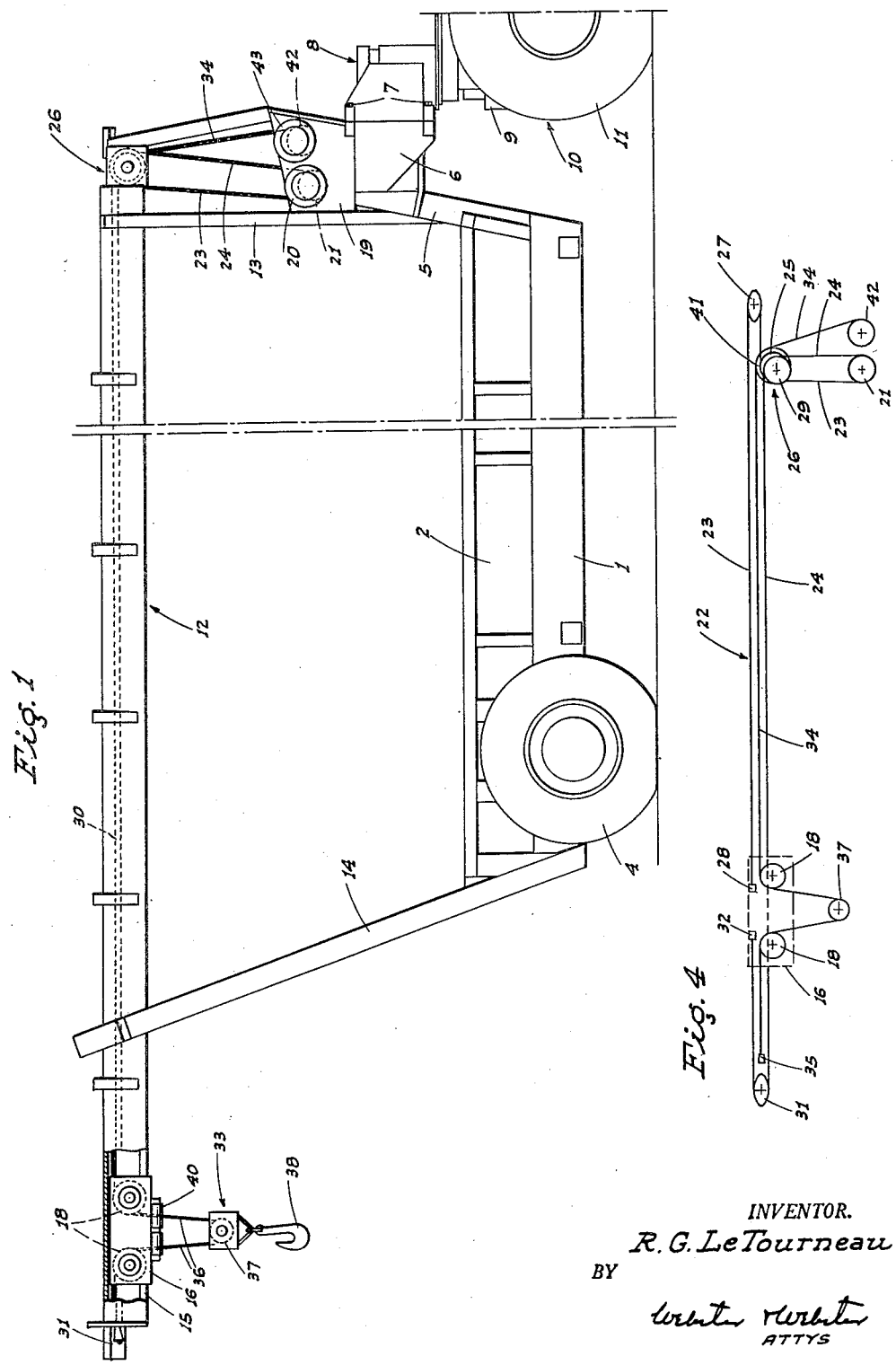
INVENTOR.
R. G. LeTourneau
BY
ATTYS

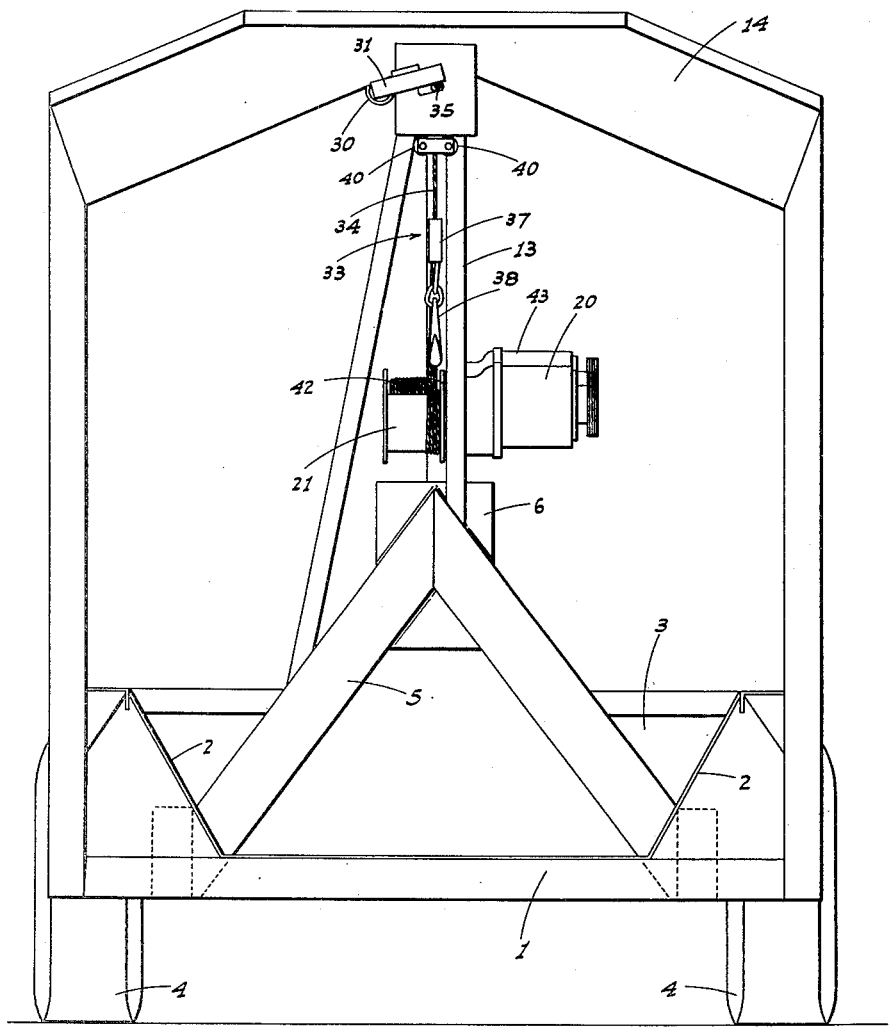

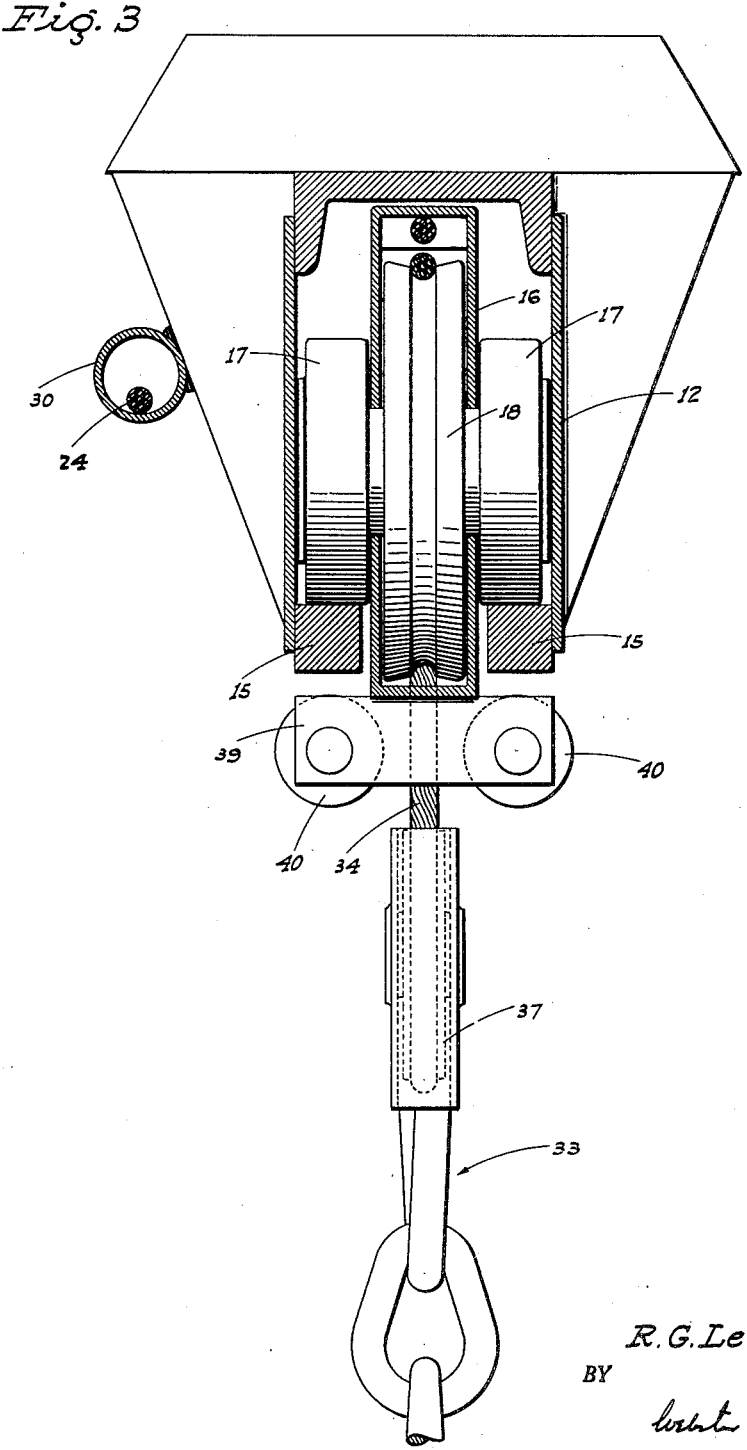

Patented May 9, 1950

2,506,930

UNITED STATES PATENT OFFICE 2,506,930

WAGON LOADING MECHANISM

Robert G. Le Tourneau, Peoria, Ill., assignor to R. G. Le Tourneau, Inc., Stockton, Calif., a corporation of California Application June 11, 1946, Serial No. 675,886

1 Claim. (Cl. 212—95)

This invention relates in general to heavy-duty load transporting wagons.

In particular this invention is directed to, and it is an object to provide, an improved, power actuated, wagon-loading mechanism; such mechanism being mounted on the wagon in unitary relation and thus always available for ready use.

While especially designed for use on wagons which haul pulp-wood logs from the forest where cut, the mechanism obviously can be used on wagons adapted to haul other types of loads.

Another object of the invention is to provide a wagon loading mechanism which includes a longitudinally extending overhead rail assembly mounted on the wagon and projecting to a termination to the rear of the latter; there being a power actuated carriage movable along the rail assembly, and a power actuated, load lifting unit depending from the carriage.

A further object of the invention is to provide a wagon loading mechanism, as in the preceding paragraph, which includes a novel cable system arranged to operate the carriage and said load lifting unit selectively and independently; the system being designed so that the load lifting unit, which depends from the carriage, remains in any selected or adjusted position regardless of travel of the carriage.

An additional object of the invention is to provide a wagon loading mechanism which is operative to readily and quickly pick up a load from the ground at the rear of the wagon and to then move the load forwardly and deposit the same on the bed of the wagon.

A further object of the invention is to provide a practical wagon loading mechanism, and yet one which will be exceedingly effective for the purpose for which it is designed.

These objects are accomplished by means of such structure and relative arrangement of parts as will fully appear by a perusal of the following specification and claim.

In the drawings:

Fig. 1 is a side elevation of a load transporting wagon embodying the present invention.

Fig. 2 is a rear end view of the same.

Fig. 3 is an enlarged fragmentary cross section through the longitudinally extending rail assembly, showing the mounting of the carriage therein.

Fig. 4 is a diagrammatic view of the cable system.

Referring now more particularly to the characters of reference on the drawings, the loading mechanism is here shown incorporated in a load transporting wagon which includes a low bed 1 having upwardly and outwardly flaring sides 2, the wagon being closed at its forward end 3, but open at its rear end.

The wagon is supported, adjacent its rear end, by a pair of transversely spaced pneumatic-tired wheels 4. At its forward end 3 the wagon is formed with a coupling unit which includes a pair of forwardly and upwardly converging front end beams 5, which are fixed at their upper ends to a rigid, forwardly projecting neck 6. The neck 6 is connected by bolts 7 to a matching part of a power steering unit 8 which upstands from the rear deck 9 of a tractor, indicated generally at 10, which tractor includes transversely spaced pneumatic-tired drive wheels 11. A longitudinally extending overhead rail assembly, indicated generally at 12, is disposed a substantial distance above the bed 1 in a plane centrally between the sides 2; said rail assembly being supported, adjacent its forward end, by rigid posts 13 fixed on the front end of the wagon and upstanding therefrom. The rear end portion of the rail assembly 12 extends rearwardly to a termination some distance back of the wagon, and said rail assembly is supported, adjacent but short of its rear end, by an arch frame 14 fixed on the wagon at the rear and extending upwardly therefrom at a rearward incline; such arch frame permitting of loading of material onto the bed 1 from the rear of the wagon, without obstruction.

The overhead rail assembly 12 is hollow, and at the bottom thereof includes a transversely spaced pair of internal rails 15. A hollow carriage 16 is disposed in the rail assembly 12 for movement lengthwise thereof; said carriage including, adjacent opposite ends thereof, transversely spaced pairs of relatively large-diameter rollers 17 which ride on corresponding ones of the internal rails 15 from above; the lower portion of the carriage depending between said rails, as clearly shown in Fig. 3.

Between each pair of rollers 17, and concentric thereto, the carriage includes a relatively large-diameter cable pulley 18; said cable pulleys being spaced apart lengthwise in the carriage, for the purpose which will hereinafter appear.

The carriage 16 is power actuated in a forward or rearward direction, selectively, as follows:

A laterally facing, upstanding mounting plate 19 is fixed in connection with the neck 6, and a reversible electric winch 20 is mounted on said plate in laterally projecting relation; said winch including a cable drum on the opposite side of said plate with the axis of said drum horizontal and extending transversely of the wagon.

A carriage control cable, indicated generally at 22, is wound, intermediate its ends, about the drum 21 and thence extends, from opposite sides of the latter, as two separate cable reaches, one reach being indicated at 23, while the other reach is indicated at 24. The reeving of the cable reaches 23 and 24 is as follows:

The cable reach 23 leaves the drum 21 and extends upwardly over a horizontal-axis, direction-changing sheave 25 in a multiple sheave block 26 mounted at the forward end of the rail assembly, and thence said reach 23 extends forwardly about a vertical-axis, direction-changing sheave 27 ahead of the block 26 and substantially alined with the front end of the rail assembly. From the sheave 27 the cable reach 23 extends rearwardly within the hollow rail assembly and connects, as at 28, to the carriage 16.

The other cable reach 24 extends upwardly from the drum 21 about a horizontal-axis, direction-changing sheave 29 in the block 26 and thence extends rearwardly, alongside the rail assembly 12, in a tubular guide or pipe 30 which runs full length of said rail assembly. At the rear end of the rail assembly the cable reach 24 runs out of the pipe about a vertical-axis, direction-changing sheave 31, and thence passes into the rail assembly at its rear end. The reach 24 then extends forwardly to connection with the carriage 16, as at 32.

With the above described winch and cable arrangement, the carriage is moved along the rail assembly, in forward or rearward directions, by selective operation of the reversible electric winch 20.

A load lifting unit, indicated generally at 33, is vertically adjustably suspended from the carriage 16, and said unit is constructed and operated as follows:

A lift cable 34 is anchored within the rail assembly 12 adjacent its rear end, as at 35, and said cable thence extends forwardly into the carriage and is looped downwardly between the cable pulleys 18, as at 36; the lift cable thus running over both of said cable pulleys 18. From the foremost cable pulley 18 the lift cable 34 extends forwardly in the rail assembly to its front end, whence it is reeved as hereinafter described.

The cable loop 36 extends through a sheave block 37 fitted with a depending hook 38. The carriage 16 is fitted, at the bottom, with pairs of spaced, transversely extending cross heads 39 between which the runs of the loop 36 pass; said cross heads having cable guide spools 40 journaled therein on opposite sides of said cable runs. These cable guide spools cause the lift cable 34 to maintain track on the pulleys 18.

At the front end of the rail assembly 12 the cable reach 34 passes over a horizontal-axis, direction-changing sheave 41 in the multiple-sheave block 26, and thence extends downward to, and is wound about, the cable drum 42 of a reversible electric winch 43. The electric winch 43 is mounted on the upstanding plate 19 adjacent the winch 20, and the axis of cable drum 42 is parallel to the axis of drum 21.

With operation of the electric winch 43, the effective length of the lift cable 34 is varied, causing raising or lowering of the load lifting unit 33, depending on the direction of rotation of said winch 43.

It should be noted that the reeving of the lift cable 34 is such that the carriage 16 may be shifted along the rail assembly without affecting the adjusted position of the load lifting unit 33; this for the reason that the loop 36 runs through the carriage 16 and block 37 with movement of said carriage.

When the above described wagon loading mechanism is in use the wagon is backed to a point closely adjacent the load, and thereafter the load lifting unit 33 is lowered and suitably engaged with said load. The unit 33, with the load suspended therefrom, is then elevated by operation of the winch 43, and when the load reaches a sufficient height, the carriage 16 is advanced, by operation of the winch 20, whereby the load is shifted to a position directly above the bed 1. Thereupon, the unit 33 is lowered until the load rests in the wagon on said bed 1.

With the wagon loading mechanism, heavy and cumbersome loads can be picked up from the ground and placed in the wagon quickly, and without difficulty. Another advantage is the fact that the wagon loading mechanism is a unitary part of the wagon and is thus always available for immediate use.

The reversible electric winches 20 and 43 are of a type which include a normally set brake, which brake automatically releases when the winch is operated. As a consequence the carriage 16, and the load lifting unit 33, always maintain their adjusted position when the corresponding winch is not in operation.

The winches 20 and 43 are interposed in an operating and control circuit, not shown, but which includes switches accessible to the operator of the tractor 10; such circuit being energized through the medium of a heavy-duty generator on the tractor.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In a vehicle loading mechanism which includes a pair of longitudinally extending laterally spaced apart rails supported above a vehicle, a carriage comprising a frame disposed between and depending below the rails, a pair of spaced apart rollers journaled at each end of the frame and riding the rails, a pulley journaled in the frame between each pair of rollers, a cable anchored adjacent one end of the rails and reeved over one pulley, thence being looped downwardly between the pulleys and then reeved over the other pulley and extending thence longitudinally of the rails, a winch to which the other end of the cable is operatively connected, a load suspending unit including a sheave supported in rolling relation in the loop in the cable below the carriage, means to selectively pull the carriage along the rails in one direction or the other, a pair of spaced transversely extending cross heads fixed to the lower edge of said frame, and guide spools journaled in the cross heads on opposite sides of the cable loop which depends below the pulleys.

ROBERT G. LE TOURNEAU.

REFERENCES CITED

The following references are of record in the file of this patent:

UNITED STATES PATENTS

| Number | Name | Date |
|---|---|---|
| 451,260 | Brodesser | Apr. 28, 1891 |
| 946,321 | Bergren | Jan. 11, 1910 |
| 1,025,287 | Mattson | May 7, 1912 |
| 1,635,338 | Otterson | July 12, 1927 |
| 1,775,398 | Kacena | Sept. 9, 1930 |
| 1,967,166 | Walker | July 17, 1934 |
| 2,405,299 | Godwin | Aug. 6, 1946 |